United States Patent
Zucker et al.

(10) Patent No.: US 11,599,565 B2
(45) Date of Patent: Mar. 7, 2023

(54) MESSAGING-ENABLED TRAVEL INTEGRATION PROCESSING

(71) Applicant: NCR Corporation, Atlanta, GA (US)

(72) Inventors: Brent Vance Zucker, Roswell, GA (US); Arungandhi Indrapuram Chinnasamy, Lawrenceville, GA (US); Narendra Dubey, Hyderabad (IN); James Zhonghui Ge, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 122 days.

(21) Appl. No.: 16/117,541

(22) Filed: Aug. 30, 2018

(65) Prior Publication Data

US 2020/0073999 A1  Mar. 5, 2020

(51) Int. Cl.
| | |
|---|---|
| *G06F 16/332* | (2019.01) |
| *G10L 15/22* | (2006.01) |
| *G06F 16/338* | (2019.01) |
| *G06F 16/9537* | (2019.01) |

(52) U.S. Cl.
CPC ........ *G06F 16/3329* (2019.01); *G06F 16/338* (2019.01); *G06F 16/9537* (2019.01); *G10L 15/22* (2013.01); *G10L 2015/223* (2013.01)

(58) Field of Classification Search
CPC ................. G10L 15/22; G10L 15/18
See application file for complete search history.

(56) References Cited

U.S. PATENT DOCUMENTS

| | | | | |
|---|---|---|---|---|
| 5,748,974 A | * | 5/1998 | Johnson | G06F 3/038 704/9 |
| 7,921,214 B2 | * | 4/2011 | Da Palma | H04L 51/02 709/206 |
| 10,540,729 B1 | * | 1/2020 | Maeng | H04W 4/02 |
| 10,594,840 B1 | * | 3/2020 | Darby | H04W 4/14 |
| 2004/0117275 A1 | * | 6/2004 | Billera | G10L 15/26 705/28 |
| 2008/0147406 A1 | * | 6/2008 | Da Palma | H04L 51/02 704/E15.04 |
| 2014/0081633 A1 | * | 3/2014 | Badaskar | G10L 15/26 704/235 |
| 2014/0249803 A1 | * | 9/2014 | Jackson | G06F 40/40 704/9 |
| 2017/0068551 A1 | * | 3/2017 | Vadodaria | G06F 3/0482 |
| 2017/0180499 A1 | * | 6/2017 | Gelfenbeyn | H04L 51/02 |

(Continued)

OTHER PUBLICATIONS

Chandramouli, Badrish, et al. "Pushing the envelope of pervasive access." ICPS'05. Proceedings. International Conference on Pervasive Services, 2005.. IEEE, 2005. (Year: 2005).*

(Continued)

*Primary Examiner* — Brian L Albertalli
(74) *Attorney, Agent, or Firm* — Schwegman, Lundberg & Woessner

(57) ABSTRACT

A user engages in spoken voice or messaging platform-based natural language dialogues with an automated bot. The bot identifies actions and subjects of the actions from the dialogues and processes Application Programming Interfaces (API) to perform travel-related queries or process travel-related transactions with travel services. Real-time responses to queries or completed transaction notifications are provided back to the user by the bot during the dialogues.

17 Claims, 6 Drawing Sheets

(56) References Cited

U.S. PATENT DOCUMENTS

2018/0174152 A1* 6/2018 Fortin .................. G10L 17/005
2019/0387031 A1* 12/2019 Steinbach ........... H04L 65/1006

OTHER PUBLICATIONS

Zografos, Konstantinos G., Konstantinos N. Androutsopoulos, and Vassilis Spitadakis. "Design and assessment of an online passenger information system for integrated multimodal trip planning." IEEE Transactions on Intelligent Transportation Systems 10.2 (2009): 311-323. (Year: 2009).*

* cited by examiner

MESSAGING-ENABLED TRAVEL INTEGRATION PROCESSING

BACKGROUND

Businesses provide their own service-based online interfaces and mobile-based applications for purposes of making their customer-based services available to customers from devices operated by the customers, such devices can include: tablets, mobile phones, laptops, etc.

Furthermore, businesses integrate and provide their services to customers through existing messaging platforms, such as email, text messaging, instant messaging, social media, browsers, etc.

Essentially, businesses want to have a presence and be accessible to customers on any customer-operated device at any time and within any desired platform most-often utilized by their customers. This maximizes customer participation in the business services, increases customer loyalty with the brands of the businesses, increases business revenues, and reduces business expense associated with providing human-based assistance to the customers.

However, customers are being inundated with mobile applications all of which have their-own proprietary interfaces. These applications clutter a customer's mobile device and often times the customer is unaware that they have a specific-business's mobile application on his/her device when it is needed. Customers are also unlikely to be able to successfully navigate the mobile application's interface and/or remember logon credentials when the customers need the services of the application even when they find the appropriately installed application on their devices.

These problems are exacerbated when time is of the essence to a customer, such as within a travel context. For example, a typical airline traveler is often required to remember a variety of travel-related information, such as flight number, seat number, boarding time, gate number, departure time, arrival time, connecting flight details, and the like. Printed boarding passes are being phased out in the industry and even when a printed boarding pass is obtained by the traveler, the traveler has to remember where the customer put it to view it, since the traveler is managing carry-on baggage, photo identification, the airport security gates, departure gates, and luggage while the traveler is experiencing stress as a result of the travel environment. Still further, obtaining a printed boarding pass at the airport may entail waiting in long lines at kiosks or at clerk assistance terminals, neither of which is appealing to any traveler.

Consequently, even with all the available technology many travelers still struggle with airport travel and travelers consistently list, in consumer surveys, that travel is one of the most frustrating, stressful, and generally problematic experiences faced by travelers.

SUMMARY

In various embodiments, methods and a system for messaging-enabled travel integration processing are presented.

According to an embodiment, a method for messaging-enabled travel integration processing is provided. Specifically, and in one embodiment, a natural-language input provided by a user is received. A subject and an action are identified from the natural-language input. The action is processed with a service that is identified based on the subject. Finally, natural-language results are provided back to the user based on results returned from the service.

DETAILED DESCRIPTION

Figure 1A:
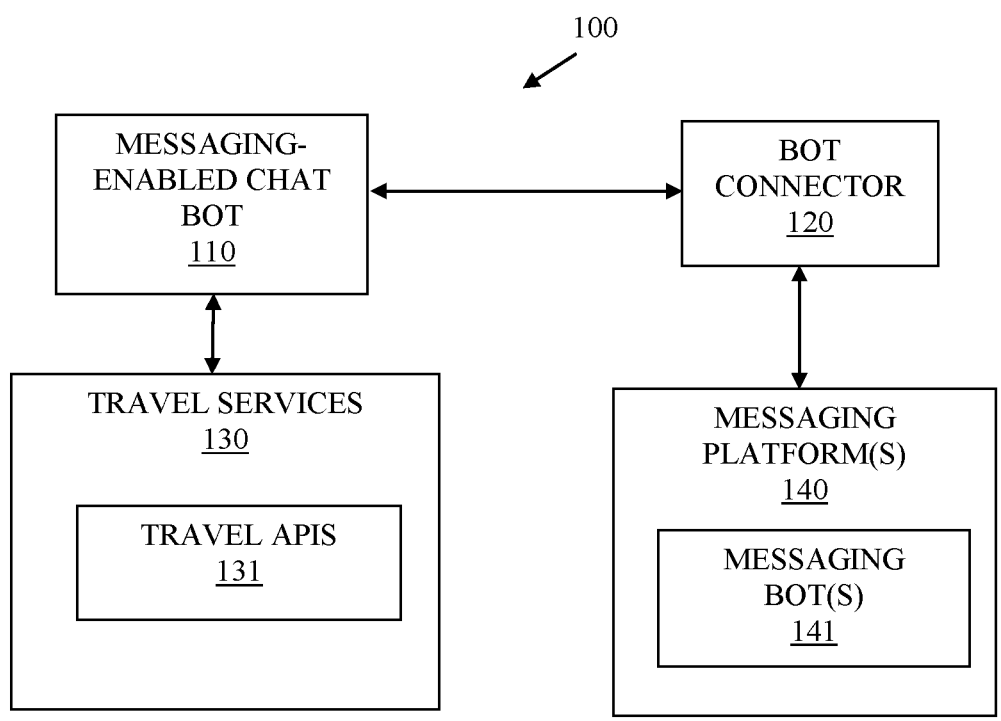
FIG. 1A is a diagram of a system for messaging-enabled travel integration processing, according to an example embodiment.

FIG. 1A is a diagram of a system 100 for messaging-enabled travel integration processing, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the messaging-enabled travel integration processing techniques presented herein and below.

Moreover, various components are implemented as one or more software modules, which reside in non-transitory storage and/or hardware memory as executable instructions that when executed by one or more hardware processors perform the processing discussed herein and below.

The techniques, methods, and systems presented herein and below for messaging-enabled travel integration processing can be implemented in all, or some combination of the components shown in one or more hardware computing devices having one or more hardware processors.

The system 100 includes: a messaging-enabled chat bot 110, a bot connector 120, one or more messaging platforms 140 (each messaging platform 140 have a platform-specific messaging bot 141), and one or more travel-related services 130 (each travel-related service 130 include one or more travel-related Application Programming Interfaces (APIs).

The messaging-enabled chat bot 110 can be processed on any processor-enabled device, such as but not limited to: a desktop computer, a laptop computer, a mobile phone, a tablet, a wearable processing device (watch, goggles, etc.), a processor-enabled vehicle interface within a vehicle, an intelligent appliance (light switch, lamp, garage door opener, refrigerator, television, stereo, etc.), a server, etc.

As used herein, a "messaging platform" refers to the software, interfaces, APIs, processing devices, and network connectivity used to perform messaging communications by users. A messaging platform includes, by way of example only, email, Short Message Service (SMS) text, instant message, and social-media applications (e.g., Facebook™, Slack™, Twitter™, Instagram™, Snap Chat™, LinkedIn™, etc.).

As used herein, a "messaging bot" or "bot" refers to a software application that is designed to engage in messaging activities in an automated manner as an active or passive participant within the messaging platforms. A messaging bot 141 is a logical participant in a given chat session (messaging session or dialogue) for any given messaging platform. Moreover, a messaging bot 141 is configured to perform a variety of pre-configured automated actions within messaging platforms and/or outside the messaging platforms for interaction with the bot connector 120.

The messaging-enabled chat bot 110 (hereinafter just "chat bot 110) includes a front-end user facing interface that translates natural language speech (spoken audio) received as input through a microphone into text strings representing at least a subject of an action and the action (may also be referred to herein as "use case action"). The subject and the action are processed by a back-end interface of the chat bot 110 to obtain a response based on the natural language speech received as input from the front-end user facing interface. The back-end interface of the chat bot 110 can interact with the bot connector 120 and one or more online travel services 130 through the travel APIs 131.

The bot connector 120 translates between individual messaging bots 141 operating in specific messaging platforms 140 and the chat bot 110 for automated interaction between the chat bot 110 and the messaging platforms 140.

It is to be noted, that the front-end interface of the chat bot 110 can be executed on a user-operated device while the back-end interface of the chat bot 110 can be executed on a server device. In an embodiment, both the front-end interface and the back-end interface of the chat bot 110 are executed on: the user-operated device or on the server. In an embodiment, only a portion of the front-end interface is executed on the user-operated device to relay all input audio or partially translated audio to another portion of the front-end interface that executes on the server that completes the audio-to-text translation for any untranslated audio remaining. In fact, for efficiencies reasons the front-end and back-end interfaces of the chat bot 110 can execute on multiple devices or a same device.

The chat bot 110 also includes a text-based interface that is responsive to text-messages provided as input from the user, such that the chat bot 110 is responsive to user queries and user transaction requests through both audio and text (through the text-based interface).

The chat bot 110 is activated/initiated for processing on a user-operated device through a number of manners, such as and by way of example only, selection of a mobile application, a voice command uniquely known to the chat bot, selection of an option within a user-facing interface of a mobile application, a voice command given to an existing voice-enabled service of the user-operated device (for example, Siri®, Alexa®, Echo®, Google Home® where the chat bot 110 is activated within one of these existing voice-enabled services as an enhanced skill for these services). In an embodiment, the chat bot 110 is automatically activated when the user-operated device is detected as having a current physical location that is at or within a configured geographic distance from an airport, bus station, train station, and/or subway station.

In an embodiment, a text message sent to an account of the chat bot 110 activates the chat bot; here the initial text message can include a natural language text query or transaction instruction provided by the user through a text message.

In an embodiment, an instant message sent to one of the messaging bots 141 in natural language causes the message bot 141 upon receipt of the natural language text query or transaction instruction to provide such information to the bot connector 120, and the bot connector 120 activates the chat bot 110 with the initial provided user query or text instruction.

So, the chat bot 110 can be activated and initiated for a dialogue (session) with a user through spoken audio, through spoken audio within an existing voice-enabled service of the user-operated device, through a text message, or through a social media instant message.

The dialogue (session) between the user and the chat bot 110 can be voice-based, text based, or instant messaging based. The user can switch during a same dialogue or session between different types (such as change from voice to text, change from instant messaging to voice, etc.). This can be done with an instruction in the original dialogue type (voice, text, instant message), which then causes the chat bot 110 to use the instructed dialogue type for the remainder of the dialogue (session).

Once activated for a voice dialogue, the chat bot 110 listens for received audio provided by a microphone of the user-operated device. The audio is translated into text and natural language processing is performed on the text to identify the subject and actions received in the spoken audio recorded, captured, and provided by the microphone. If the chat bot 110 is confused about the subject or the action, then clarifying speech based audio output is sent to the speakers of the user-operated device to engage the user in a dialogue to correctly identify the subject and the needed action/use case that the chat bot 110 is being requested to perform.

Once activated for text or instant message dialogues, the chat bot 110 receives text-based natural language queries or transaction instructions and parses the text to identify the subject and action. Again, clarifying output can be sent back to the user through text or instant message for purposes of the chat bot 110 accurately identifying the subject and action for the user dialogue (session). Any instant messaging-based dialogues entail interactions between the chat bot 110, the bot connector 120, and the messaging bot 141.

The actions processed by the chat bot 110 can include performing queries on behalf of the user for purposes of providing back to the user any of the following information (by way of example only) as a result (an answer) of the queries: flight time, flight number, seat assignment, gate number, boarding time, connecting flight details, and departure time.

Actions can also include performing transactions on behalf of the user, such as (by way of example only): booking a flight, upgrading or changing an existing seat assignment, and checking in for a flight to obtain a boarding pass for the flight.

It is noted that these actions can be any travel-related query that returns answers representing the results of those queries or travel-related transactions. Travel-related includes air, train, ship, subway, bus, car rental, Uber®, Lyft®, cab, and/or lodging.

The subject and the action are processed to identify what entity or entities that the chat bot 110 needs to engage to provide a user answer to a query or perform a user travel transaction. For example, an input to a start of a dialogue provided by the user through voice, text, or instant message may be "what time is my flight to ATL?" (ATL an abbreviation for Atlanta International Airport.) The subject is Atlanta International Airport and the action or use case (the answer output expected by the user) is time of the flight. If the bot 110 does not have access to a user's airline loyalty account, then the bot 110 may need clarification and may ask the user "what airline or what is your reservation number?" Once the bot 110 has sufficient information, the bot 110 uses an API 131 to contact a travel service 130 with the customer's last name and/or reservation number to query that travel service 130 on behalf of the user, results are returned from the API 131 and the bot 110 translates the results into natural language speech, text, or instant message and provides as output to the user, such as "your flight leaves at 8:00 am out of Terminal A gate 60."

The bot 110 can be configured by the user for linking services of the user for automated access by the bot 110, such that the user can grant access to travel-related loyalty services 130 and/or a user's digital wallet (such as Apple Wallet®). Linking may entail the user granting the bot 110 access to the user's account (via user id and credential) to the mobile application and/or website for each of the user's travel services. This can permit the bot 110 to use an appropriate API 131 to query these services 130, such that in some embodiments, the bot 110 needs no clarifying information from the user to satisfy a user's query. For example, if the user already obtained a boarding pass, the boarding pass would be accessible from the user's wallet and/or from the user's airline mobile application (such that the bot can obtain the needed information and perform the action (query) on the wallet on the user-operated device (on device). However, even without such linking, clarifying information (such as the reservation number) can be processed by the bot 110 to access non-account based travel services 130 to locate an answer to the queries through the API 131 (off device external to the user-operated device). It is also noted that the wallet can include other itinerary information for a journey of the user, such as a hotel check-in, rental car information, etc.

Again, the bot connector 120 permits a bridging interface between the bot 110 and other messaging platforms, such as email, SMS text, and social media instant message interfaces.

In some cases, the action identified in the dialogue by the bot 110 can be a series of actions, associated with multiple services including travel services 130, on device services (user wallet-based application), and messaging platform services.

The system 100 through the bot 110, the bot connector 120, the travel APIs 131, and the messaging bots 141 permits real-time dialogues with a user in spoken audio, SMS text messages, and/or instant messaging through messaging platforms for purposes of performing and answering specific travel-related queries of the user and/or performing travel-related transactions on behalf of the user. The dialogues are interactive between the bot 110 and the user and may or may not include clarifying questions submitted by the bot 110 back to the user for purposes of properly identifying the subjects and actions that the user is requesting from the bot 110 during the dialogue. The system 100 does not require the user to remember any specific travel-related application to obtain answers or perform travel-related transactions, the bot 110 provides the integration for all travel-related activities needed by the user during a user's journey (travel).

Figure 1B:
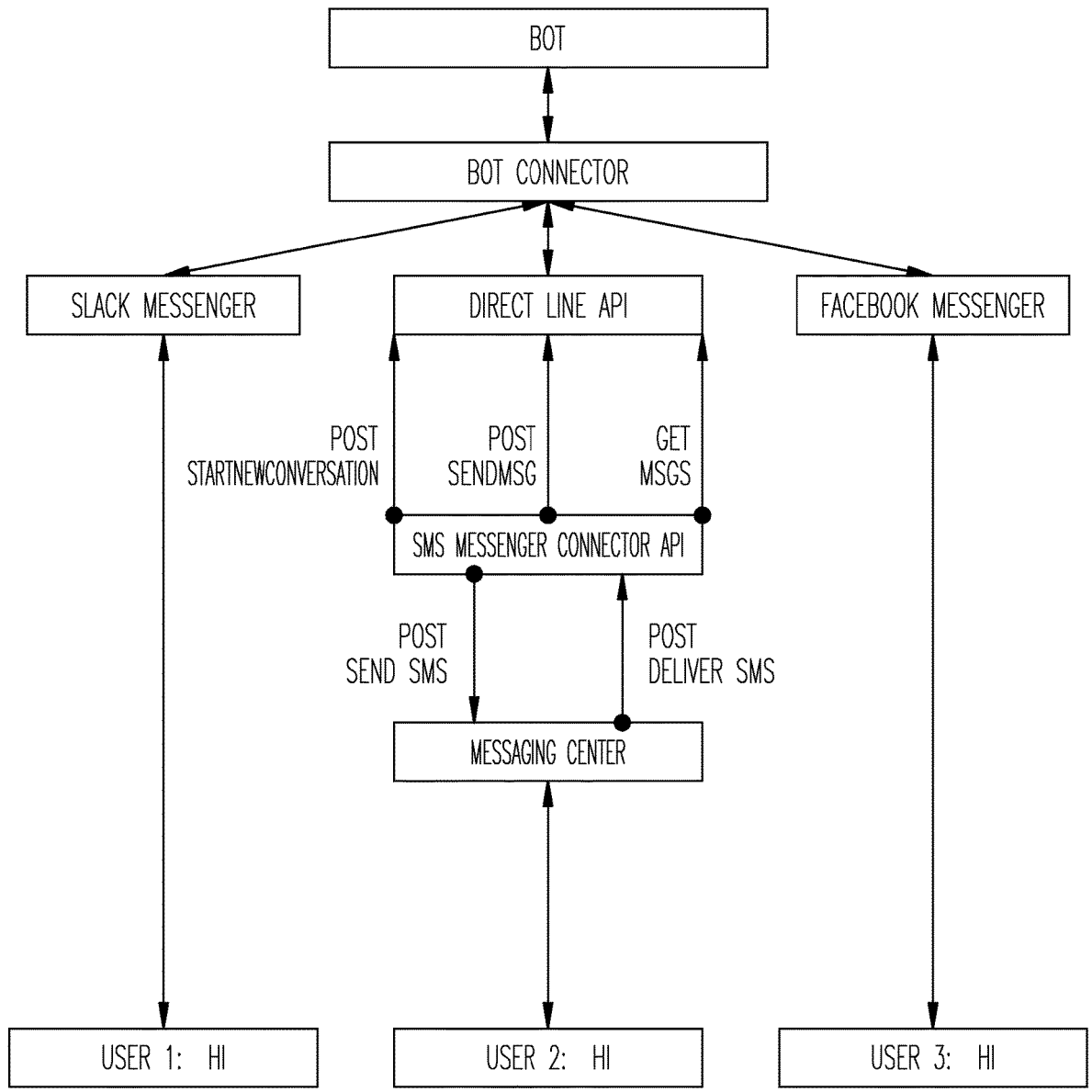
FIG. 1B is a diagram of an architectural layout for messaging-enabled travel integration processing, according to an example embodiment.

FIG. 1B is a diagram of an architectural layout for messaging-enabled travel integration processing, according to an example embodiment.

The layout shows the bot 110 having a bilateral communication connection to the bot connector 120. The bot connector 120 then interfaces with specific messaging platforms 140 through automated bots 141 (shown as Slack® and Facebook® in the FIG. 1B) and the bot connector 120 interactions with APIs 131 associated with travel services 130 and APIs associated with other messaging services 130 (such as SMS text—shown in the FIG. 1B as the Direct Line API, SMS Messenger Connector API, and Messaging Center). The user can connect for a dialogue through any of the messaging platforms 140 (such as through Slack®, Facebook®, and/or SMS text messaging).

As noted above with the discussion of the FIG. 1A the user may directly connect through spoken audio to the bot 110 as well.

Figure 1C:
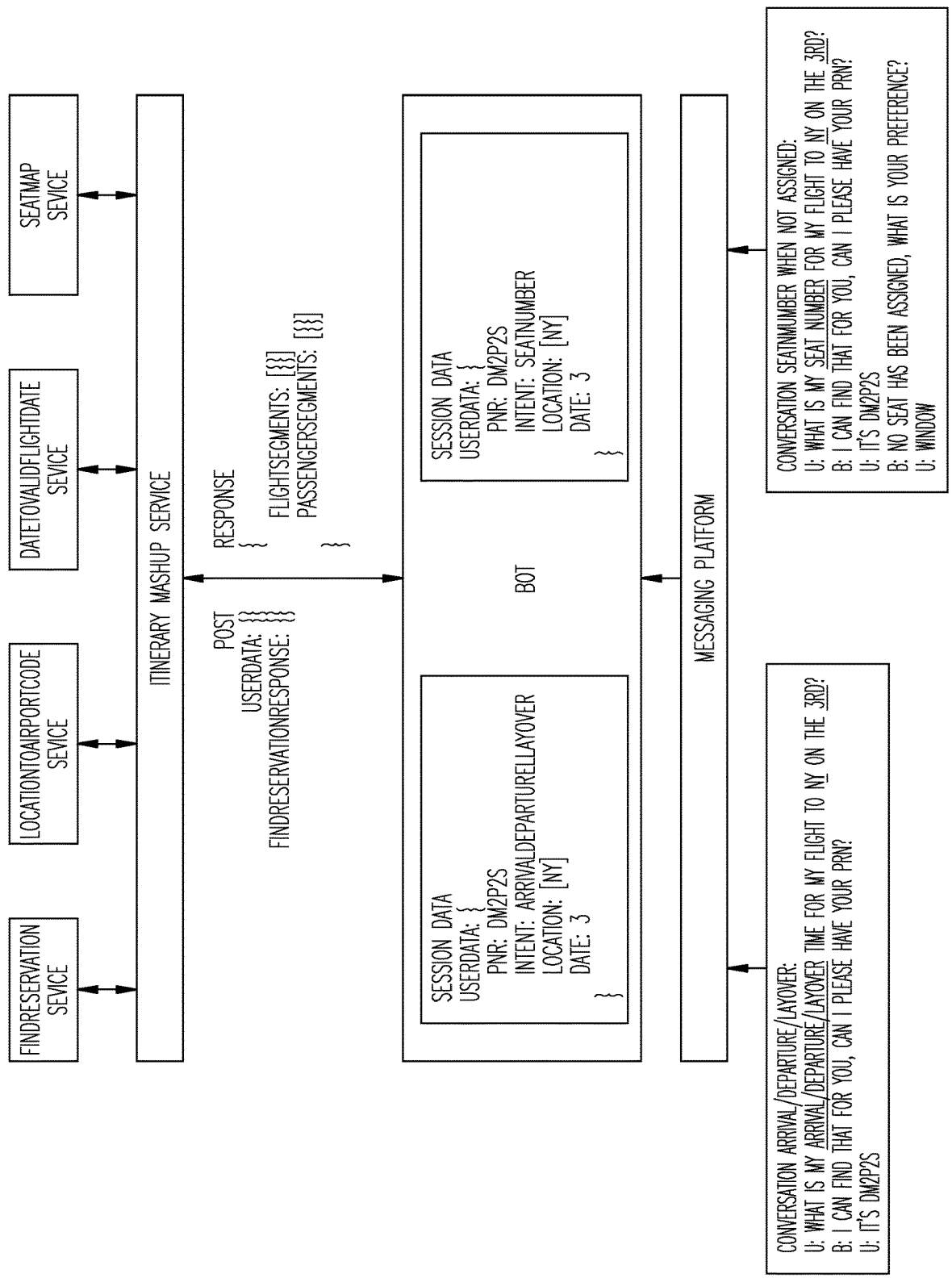
FIG. 1C is a diagram of another architectural layout for messaging-enabled travel integration processing, according to an example embodiment.

FIG. 1C is a diagram of another architectural layout for messaging-enabled travel integration processing, according to an example embodiment.

The FIG. 1C illustrates an architectural layout for a user that initiates a dialogue or session with the bot 120 through a messaging platform (social media instant messaging and/or SMS text messaging). The dialogue is a session or conversation in natural language between the user and the bot 110 interacting through the messaging platform interface. At the bottom of the FIG. 1C, sample conversations are presented with questions or instructions provided by the user designated as "U" and the responses from the bot designated as "B." A message bot 141 associated with the message platform 140 provides the information to the bot connector 120, which translates and provides to the bot 110. The session data identifies the intent of the user as the use case or action and the subject as location. The bot 120 interacts with an itinerary mashup service that directly interacts with travel services 130 (identified as FindReservation Service, LocationToAirportCode Service, DateToVaildFlightDate Service, and SeatMap Service in the FIG. 1C).

In this manner an intermediary service, such as the itinerary mashup service can provide a single interface to the bot 110 for interaction, such that the bot 110 is focused on making the appropriate queries and the itinerary mashup service selects the appropriate service 130 and needed API 131 for performing the query on behalf of the bot. This architectural layout provides a more modular implementation of the system 100.

It is also noted that the architectural layout of the FIG. 1C may include an implementation or instantiation of the bot 110 within specific messaging platform 140 as an enhanced bot 141, such that no bot connector 120 is necessary. That is, an instance of the bot 110 is provided as a specific messaging platform bot 141.

In an embodiment, the user-operated device is one of: a mobile phone, a tablet, a laptop, a desktop computer, a wearable processing device, a network and voice-enabled Internet-of-Things (IoTs) device (such as Amazon® Echo®, Google® Home®, etc.).

One now appreciates how voice-enabled travel integration processing and messaging-enabled travel integration processing are achieved through the system 100 and/or the architectural layouts of the system 100 as presented in the FIGS. 1A-1C. This provides a user real-time travel answers and travel-related transaction processing through messaging platforms preferred by the user and/or through spoken audio interaction.

The embodiments of FIGS. 1A-1C and other embodiments are now discussed with reference to the FIGS. 2-4.

Figure 2:
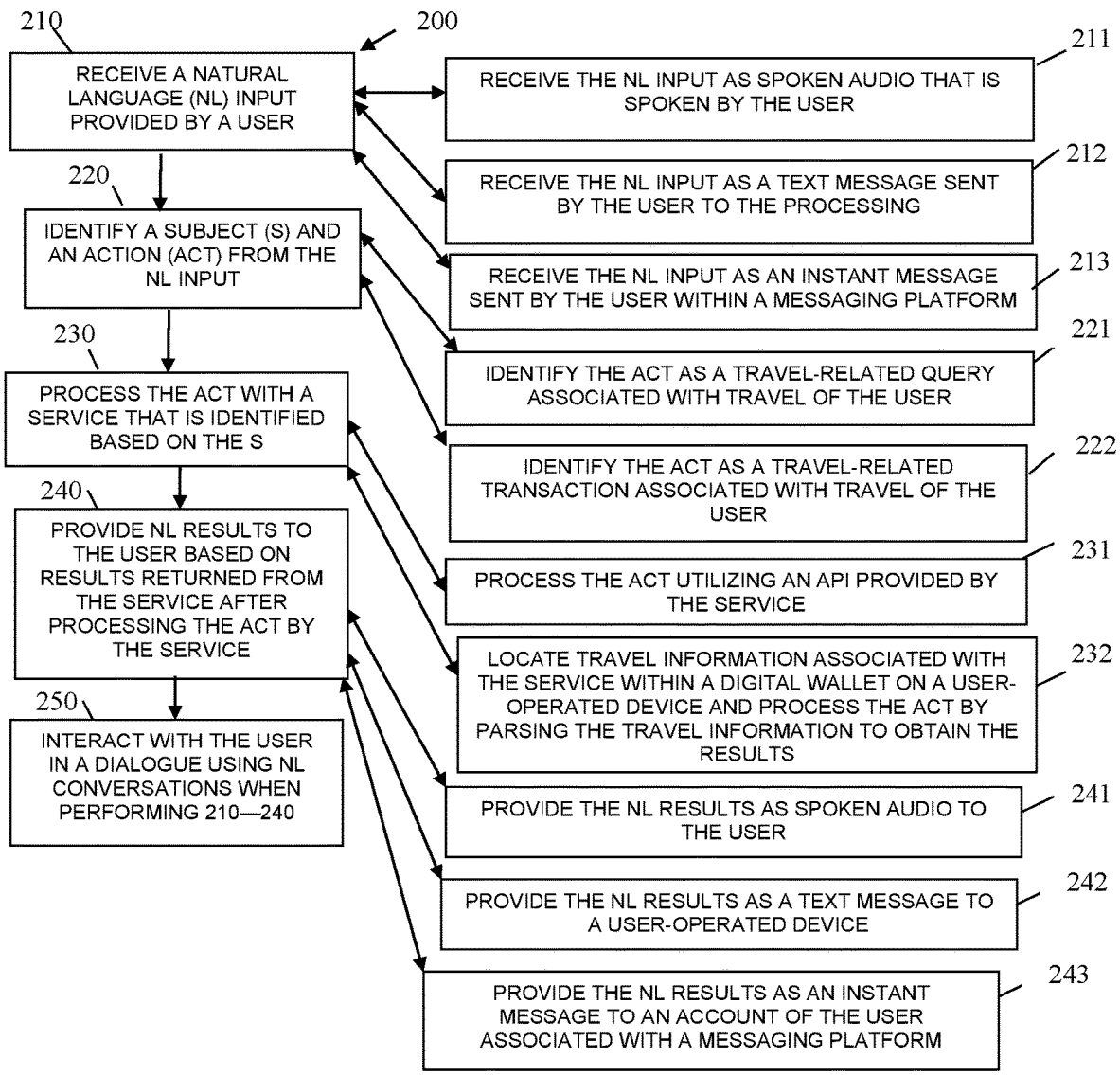
FIG. 2 is a diagram of a method for messaging-enabled travel integration processing, according to an example embodiment.

FIG. 2 is a diagram of a method 200 for messaging-enabled travel integration processing, according to an example embodiment. The software module(s) that implements the method 200 is referred to as a "travel integration bot." The travel integration bot is implemented as executable instructions programmed and residing within memory and/or a non-transitory computer-readable (processor-readable) storage medium and executed by one or more hardware processors of one or more hardware computing devices. The processors of the devices that execute the travel integration bot are specifically configured and programmed to process the travel integration bot. The travel integration bot has access to one or more networks during its processing. The networks can be wired, wireless, or a combination of wired and wireless.

In an embodiment, the device that executes the secure messaging payment manager is a user operated device, a server device, or a set of devices that process in a cloud processing environment.

In an embodiment, different portions of the travel integration bot execute on different devices. For example, a user-facing interface may at least partially process on a user operated device while a back-end interface of the travel integration bot processes on cloud server devices.

In an embodiment, the device that executes the travel integration bot is a server.

In an embodiment, the travel integration bot is some combination of or all of: the bot 110 and/or the bot connector 120.

At 210, the travel integration bot receives natural language input provided by a user. The natural language input is either spoken audio (speech of a human communication language) or written human communication language. In some embodiments, abbreviated written human communication language and/or acronyms that are common to a specific messaging platform (such as text or instant messaging acronyms) can be included in the natural-language input. The travel integration bot initiates a dialogue that includes natural-language conversations with the user in response to receipt of the natural-language input provided by the user.

In an embodiment, at 211, the travel integration bot receives the natural-language input as spoken audio (speech) that is spoken by the user into a microphone and provided to the travel integration bot.

In an embodiment, at 212, the travel integration bot receives the natural-language input as a text message sent by the user to the travel integration bot (through a text messaging platform and directed to an account, contact, or number associated with the travel integration bot by the user).

In an embodiment, at 213, the travel integration bot receives the natural-language input as an instant message sent by the user within a social media platform, such as and by way of example only Facebook® Messenger® or Slack® instant messages.

At 220, the travel integration bot identifies a subject and an action from the natural-language input. That is, the travel integration bot translates speech received from audio to text if the natural-language input is spoken audio. The text (translated from audio or provided in text or instant messages) is then parsed using grammars to identify parts of the input and specifically to identify a subject and an action. Again, the travel integration bot can engage the user in interactive conversations during the dialogue to clarify the input for properly identifying the subject and the action from the input (as was discussed above). Existing speech and natural language processing services can be used for analyzing the natural-language input and identify the subject and the action.

In an embodiment, at 221, the travel integration bot identifies the action as a travel-related query associated with travel of the user. Such queries can include by way of example only, flight arrival times, flight departure times, connecting flight times, seat assignments, and flight check-in information.

In an embodiment, at 222, the travel integration bot identifies the action as a travel-related transaction associated with the user. Such travel-related transactions can include by way of example only, changing seat assignments, upgrading seats, rescheduling a flight, booking a flight, purchasing in-flight goods or services, and other transactions.

At 230, the travel integration bot processes the action with a service that is identified based on the subject of the natural language input. That is, the subject provides an indication as to what type of service is needed for processing the action.

In an embodiment, at 231, the travel integration bot processes the action utilizing an API provided by the service. In an embodiment, the API is API 131 and the service is the travel service 130.

In an embodiment, at 232, the travel integration bot locates travel information associated with the service within a digital device on a user-operated device and processes the action by parsing the travel information to obtain results.

At 240, the travel integration bot provides natural-language results back to the user based on results returned from the service after processing the action by the service (or after parsing the digital wallet as discussed in the embodiment of 232).

In an embodiment, at 241, the travel integration bot provides the natural-language results as spoken audio to the user (human communication language speech).

In an embodiment, at 242, the travel integration bot provides the natural-language results as a SMS text message (human written communication language text) to a user-operated device.

In an embodiment, at 243, the travel integration bot provides the natural-language results as an instant message (human written communication language text) to an account of the user associated with a social media messaging platform.

According to an embodiment, at 250, the travel integration bot interacts with the user in a dialogue using natural-language conversations when processing 210-243. This is interactive conversations between the user and the travel integration bot in a human communication language.

In an embodiment, the travel integration bot is configured to identify the human communication language based on the natural-language input initially provided by the user at 210 to initiate the dialogue between the travel integration bot and the user.

Figure 3:
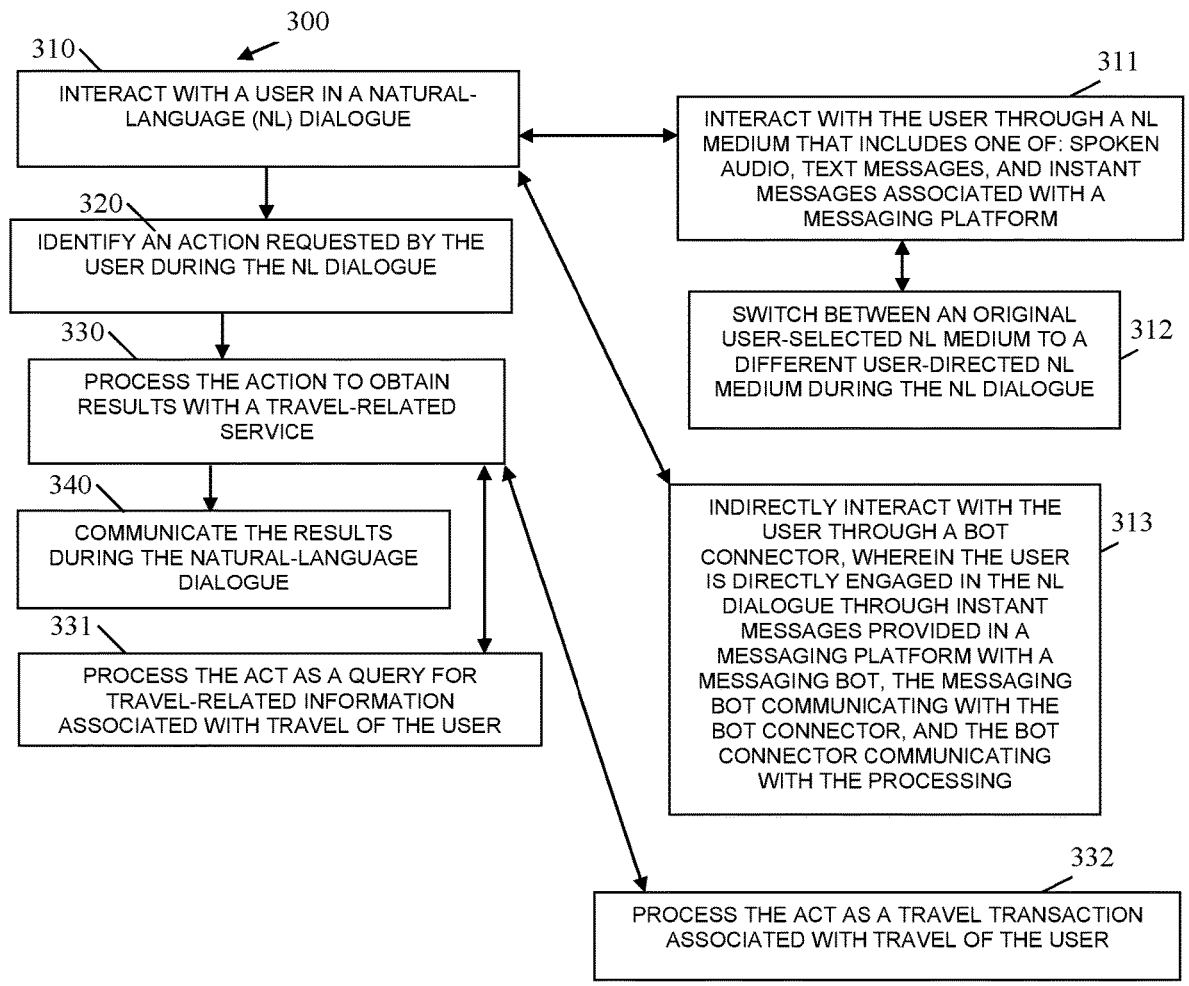
FIG. 3 is a diagram of another method for messaging-enabled travel integration processing, according to an example embodiment.

FIG. 3 is a diagram of another method 300 for messaging-enabled travel integration processing, according to an example embodiment. The software module(s) that implements the method 300 is referred to as a "travel assistant." The travel assistant is implemented as executable instructions programmed and residing within memory and/or a non-transitory computer-readable (processor-readable) storage medium and executed by one or more hardware processors of one or more hardware devices. The processors of the devices that execute the travel assistant are specifically configured and programmed to process the travel assistant. The travel assistant has access to one or more networks during its processing. The networks can be wired, wireless, or a combination of wired and wireless.

The travel assistant presents another and in some ways enhanced perspective of the method 200.

In an embodiment, the travel assistant is some combination of or all of: the bot 110, the bot connector 120, and/or the method 200.

In an embodiment, the device that executes the travel assistant is a single user-operated device.

In an embodiment, the device that executes the travel assistant is a single server device or set of server devices operating as a cloud server.

In an embodiment, the travel assistant executes on a plurality of devices, such as a user-operated device and a cloud server.

At 310, the travel assistant interacts in real time with a user in a natural-language dialogue (session).

In an embodiment, at 311, the travel assistant interacts with the user through a natural-language medium that includes one of: spoken audio, text messages, and instant messages associated with a social media messaging platform.

In an embodiment of 311 and at 312, the travel assistant switches between an original user-selected natural-language medium to a different user-directed natural-language medium during the natural-language dialogue. This may be particularly useful to the use when the dialogue is initiated in spoken audio and the environment of the user becomes noisy and the user desires to switch to text messages.

In an embodiment, at 313, the travel assistant indirectly interacts with the user through a bot connector (such as bot connector 120). The user is directly engaged in the natural-language dialogue through instant messages provided in a social media or text messaging platform with a messaging bot. The messaging bot communicates with the bot connector, and the bot connector communicates with the travel assistant.

At 320, the travel assistant identifies an action requested by the user during the natural-language dialogue by analyzing the natural language human communication language provided by the user during the dialogue to identify what the user is requesting of the travel assistant.

At 330, the travel assistant processes the action to obtain results with a travel-related service (travel-related is defined above with the discussion of the FIGS. 1A-1C).

In an embodiment, at 331, the travel assistant processes the action as a query for travel-related information associated with travel (a journey) of the user.

In an embodiment, at 332, the travel assistant processes the action as a travel transactions associated with travel (a journey) of the user.

At 340, the travel assistant communicates results from processing the action during the natural-language dialogue to the user in real time. The results are communicated in the user's human communication language (spoken or written) over a user-selected natural-language communication medium (audio (through speakers of a user-operated device), SMS text (through a text account of the user), or instant messaging (through a social media account associated with a messaging platform of the user).

Figure 4:
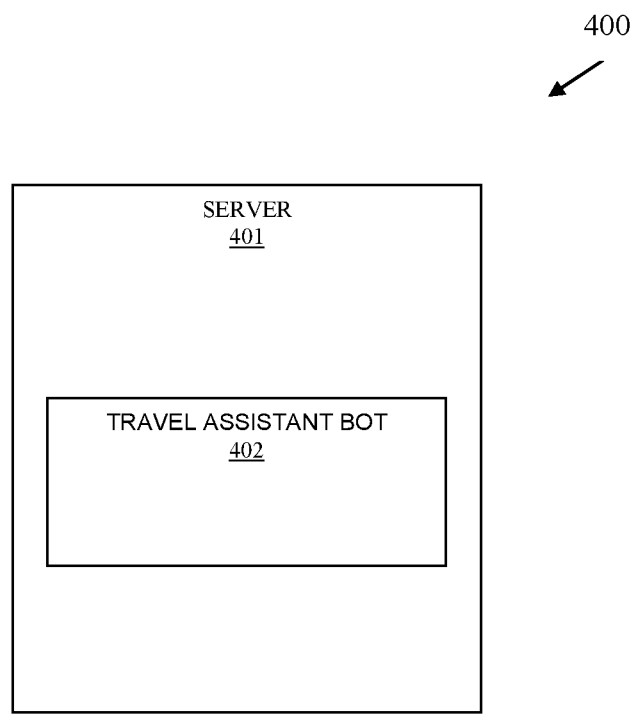
FIG. 4 is a diagram of another system for messaging-enabled travel integration processing, according to an example embodiment.

FIG. 4 is a diagram of another system 400 for messaging-enabled travel integration processing, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1C and 2-3.

In an embodiment, the system 400 implements, inter alia, the method 200 of the FIG. 2.

In an embodiment, the system 400 implements, inter alia, the method 300 of the FIG. 3.

The system 400 includes a server 401 and the server including a travel assistant bot 402.

The travel assistant bot 402 is implemented as executable instructions that are executed by multiple hardware processors of multiple computing devices from non-transitory computer-readable storage media.

In an embodiment, the travel assistant bot 402 is all or some combination of the bot 110, the bot connector 120, the method 200, and/or the method 300.

The travel assistant bot 402 is configured to: 1) execute, at least in part, on at least one hardware processor of the server 401; 2) engage a user in natural-language conversations during a dialogue; 3) identify an action to process from at least one of the natural-language conversations; 4) process the actions with a travel-related service; 5) obtain results from the action from the travel-related service; and 6) provide the results in a particular one of the natural-language conversations during the dialogue.

The travel assistant bot 402 is further configured to engage the user in the natural-language conversations through natural-language mediums that include: spoken audio, text messages, and instant messages associated with one or more social media messaging platforms.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
automatically activating a chat bot from a user-operated device that is operated by the user when the user-operated device is detected as having a current physical location that is within a configured geographic distance from an airport, a bus station, a train station, or a subway station;

receiving, by the chat bot, a natural-language input provided by the user;

identifying a subject and an action from the natural-language input;

obtaining additional information with respect to the subject and that is needed to process the action through a linked user service by using a user identifier and a user credential of the user to access a user account that the user has with the linked user service and obtaining the additional information from the linked user service;

processing the action with a service that is identified based on the subject using the additional information, wherein the service comprises an airline service, a train service, a bus service, a subway service, a ship service, a lodging service, or a car rental service, wherein processing further includes locating travel information associated with the service within a digital wallet on the user-operated device and processing the action by parsing the travel information to obtain results, wherein locating further includes obtaining the travel information from the digital wallet by using another user identifier and another user credential for the user to access the digital wallet on the user-operated device, wherein the digital wallet is an existing application on the user-operated device;

providing, by the chat bot, natural-language results to the user based on the results returned from the service;

processing a front-end interface of the chat bot from the user-operated device while processing a back-end interface of the chat bot on a server; and switching, by the chat bot, between a first natural language input type communicated by the user in a first natural-language input type to a second natural-language input type based on an instruction received from the user in the first natural language input type during interactions between the chat bot and the user.

2. The method of claim 1, wherein receiving further includes receiving the natural-language input as spoken audio that is spoken by the user.

3. The method of claim 1, wherein receiving further includes receiving the natural-language input as a text message sent by the user to the method.

4. The method of claim 1, wherein receiving further includes receiving the natural-language input as an instant message sent by the user within a messaging platform.

5. The method of claim 1, wherein identifying further includes identifying the action as a travel-related query associated with travel of the user.

6. The method of claim 1, wherein identifying further includes identifying the action as a travel-related transaction associated with travel of the user.

7. The method of claim 1, wherein processing further includes processing the action utilizing an Application Programming Interface provided by the service.

8. The method of claim 1, wherein providing further includes providing the natural-language results as spoken audio to the user.

9. The method of claim 1, wherein providing further includes providing the natural-language results as a text message to the user-operated device.

10. The method of claim 1, wherein providing further includes providing the natural-language results as an instant message to an account of the user associated with a messaging platform.

11. The method of claim 1 further comprising, interacting with the user in a dialogue using natural language conversations when processing the method.

12. A method, comprising:

automatically activating a chat bot from a user-operated device that is operated by the user when the user-operated device is detected as having a current physical location that is within a configured geographic distance from an airport, a bus station, a train station, or a subway station;

interacting, by the chat bot, with the user in a natural-language dialogue;

identifying an action requested by the user during the natural-language dialogue;

obtaining additional information that is needed to process the action through a linked user service by using a user identifier and a user credential of the user to access a user account that the user has with the linked user service and obtaining the additional information from the linked user service;

processing the action using the additional information to obtain results with a travel-related service, wherein the travel-related service comprising an airline service, a train service, a bus service, a subway service, a ship service, a lodging service, or a car rental service, wherein processing further includes locating travel information associated with the travel-related service within a digital wallet on the user-operated device and processing the action by parsing the travel information to obtain the results, wherein locating further includes obtaining the travel information from the digital wallet by using another user identifier and another user credential for the user to access the digital wallet on the user-operated device, wherein the digital wallet is an existing application on the user-operated device;

communicating, by the chat bot, the results during the natural-language dialogue;

processing a front-end interface of the chat bot from the user-operated device while processing a back-end interface of the chat bot on a server; and switching, by the chat bot, between a first natural language input type communicated by the user in a first natural-language input type during the natural language dialogue to a second natural-language input type based on an instruction received from the user in the first natural language input type during the natural language dialogue.

13. The method of claim 12, wherein interacting further includes indirectly interacting with the user through a bot connector, wherein the user is directly engaged in the natural-language dialogue through instant messages provided in a messaging platform with a messaging bot, the messaging bot communicating with the bot connector, and the bot connector communicating with the method.

14. The method of claim 12, wherein processing further includes processing the action as a query for travel-related information associated with travel of the user.

15. The method of claim 12, wherein processing further includes processing the action as a travel transaction associated with travel of the user.

16. A system (SST), comprising:

a server configured to execute executable instructions on at least one hardware processor representing at least a portion of a travel assistant bot, the executable instructions residing in a non-transitory computer-readable storage medium;

a user-operated device; and the travel assistant bot configured to:
- automatically activate a chat bot portion of the travel assistant bot from the user-operated device that is operated by the user when the user-operated device is detected as having a current physical location that is within a configured geographic distance from an airport, a bus station, a train station, or a subway station
- engage, by the chat bot portion, a user in natural-language conversations during a dialogue;
- identify an action to process from at least one of the natural-language conversations;
- obtain additional information that is needed to process the action through a linked user service by using a user identifier and a user credential of the user to access a user account that the user has with the linked user service and obtaining the additional information from the linked user service;
- process the actions with a travel-related service using the additional information, wherein the travel-related service comprising an airline service, a train service, a bus service, a subway service, a ship service, a lodging service, or a car rental service, wherein process the actions further includes locating travel information associated with the travel-related service within a digital wallet on the user-operated device and processing the action by parsing the travel information to obtain results, wherein locating further includes obtaining the travel information from the digital wallet by using another user identifier and another user credential for the user to access the digital wallet on the user-operated device, wherein the digital wallet is an existing application on the user-operated device;
- obtain the results from the action from the travel-related service;
- provide, by the chat bot portion, the results in a particular one of the natural-language conversations during the dialogue;
- process a front-end interface of the chat bot from the user-operated device while processing a back-end interface of the chat bot on the server; and
- switch, by the chat bot, between a first natural language input type communicated by the user in a first natural-language input type during that at least one of the natural-language conversations to a second natural-language input type based on an instruction received from the user in the first natural language input type during the at least one of the natural-language conversations.

17. The system of claim 16, wherein the travel assistant bot is further configured to: engage in the natural-language conversations through natural-language mediums that include: spoken audio, text messages, and instant messages associated with one or more messaging platforms.

* * * * *